US010570834B2

(12) United States Patent
Dane

(10) Patent No.: US 10,570,834 B2
(45) Date of Patent: Feb. 25, 2020

(54) SUPERCHARGING FOR IMPROVED ENGINE BRAKING AND TRANSIENT PERFORMANCE

(71) Applicant: Cummins Inc., Columbus, IN (US)

(72) Inventor: Marten H. Dane, Columbus, IN (US)

(73) Assignee: Cummins Inc., Columbus, IN (US)

( * ) Notice: Subject to any disclaimer, the term of this patent is extended or adjusted under 35 U.S.C. 154(b) by 283 days.

(21) Appl. No.: 15/336,210

(22) Filed: Oct. 27, 2016

(65) Prior Publication Data

US 2018/0119625 A1    May 3, 2018

(51) Int. Cl.
| | | |
|---|---|---|
| *F02D 41/00* | (2006.01) | |
| *F02B 37/04* | (2006.01) | |
| *F02D 13/04* | (2006.01) | |
| *F02B 37/18* | (2006.01) | |
| *F02D 41/30* | (2006.01) | |
| *F02D 41/12* | (2006.01) | |

(52) U.S. Cl.
CPC .......... *F02D 41/0007* (2013.01); *F02B 37/04* (2013.01); *F02B 37/183* (2013.01); *F02D 13/04* (2013.01); *F02D 41/0005* (2013.01); *F02D 41/123* (2013.01); *F02D 41/3094* (2013.01)

(58) Field of Classification Search
CPC .... F02B 37/04; F02B 37/183; F02D 41/0007; F02D 13/04
USPC ................................................ 60/602, 605.2
See application file for complete search history.

(56) References Cited

U.S. PATENT DOCUMENTS

| | | | | |
|---|---|---|---|---|
| 5,335,500 A | * | 8/1994 | Wunderlich | ............ F02B 37/04 123/561 |
| 5,729,978 A | | 3/1998 | Hiereth et al. | |
| 5,887,434 A | | 3/1999 | Arnell et al. | |
| 6,354,268 B1 | * | 3/2002 | Beck | ................... F02B 29/0412 123/435 |
| 6,375,442 B1 | | 4/2002 | Ward et al. | |
| 2003/0178002 A1 | | 9/2003 | Israel et al. | |
| 2008/0148730 A1 | * | 6/2008 | Akita | ....................... F02B 37/22 60/608 |
| 2011/0036088 A1 | * | 2/2011 | Xin | .......................... F02D 9/06 60/605.1 |
| 2011/0131980 A1 | | 6/2011 | Boyer et al. | |

(Continued)

FOREIGN PATENT DOCUMENTS

| | | |
|---|---|---|
| GB | 2420152 | 5/2006 |
| WO | 2013049438 | 4/2013 |
| WO | 2014081823 | 5/2014 |

OTHER PUBLICATIONS

International Search Report; International Searching Authority; US Patent and Trademark Office; International Application No. PCT/US2017/058220; dated Jan. 9, 2018; 2 pages.

(Continued)

*Primary Examiner* — Partick D Maines
*Assistant Examiner* — Dapinder Singh
(74) *Attorney, Agent, or Firm* — Taft Stettinius & Hollister LLP

(57) ABSTRACT

A supercharger device is employed in response to engine braking events and transient events to provide further compression of the intake flow and boost engine braking power and torque response. The supercharger device can be, for example, a clutched supercharger or an electronic compressor connected in the intake system of the internal combustion engine.

21 Claims, 4 Drawing Sheets

(56) References Cited

U.S. PATENT DOCUMENTS

| | | | |
|---|---|---|---|
| 2013/0090832 A1* | 4/2013 | Bevan | F02B 37/04 |
| | | | 701/102 |
| 2013/0174545 A1* | 7/2013 | Andrasko | F02B 37/12 |
| | | | 60/602 |
| 2013/0333665 A1 | 12/2013 | Pursifull | |
| 2014/0017101 A1 | 1/2014 | Staley | |
| 2015/0167590 A1* | 6/2015 | Otto zur Loye | F02M 21/0287 |
| | | | 60/601 |

OTHER PUBLICATIONS

Written Opinion; International Searching Authority; US Patent and Trademark Office; International Application No. PCT/US2017/058220; dated Jan. 9, 2018; 4 pages.

International Preliminary Report on Patentability; International Searching Authority; US Patent and Trademark Office; International Application No. PCT/US2017/058220; dated May 9, 2019; 5 pages.

\* cited by examiner

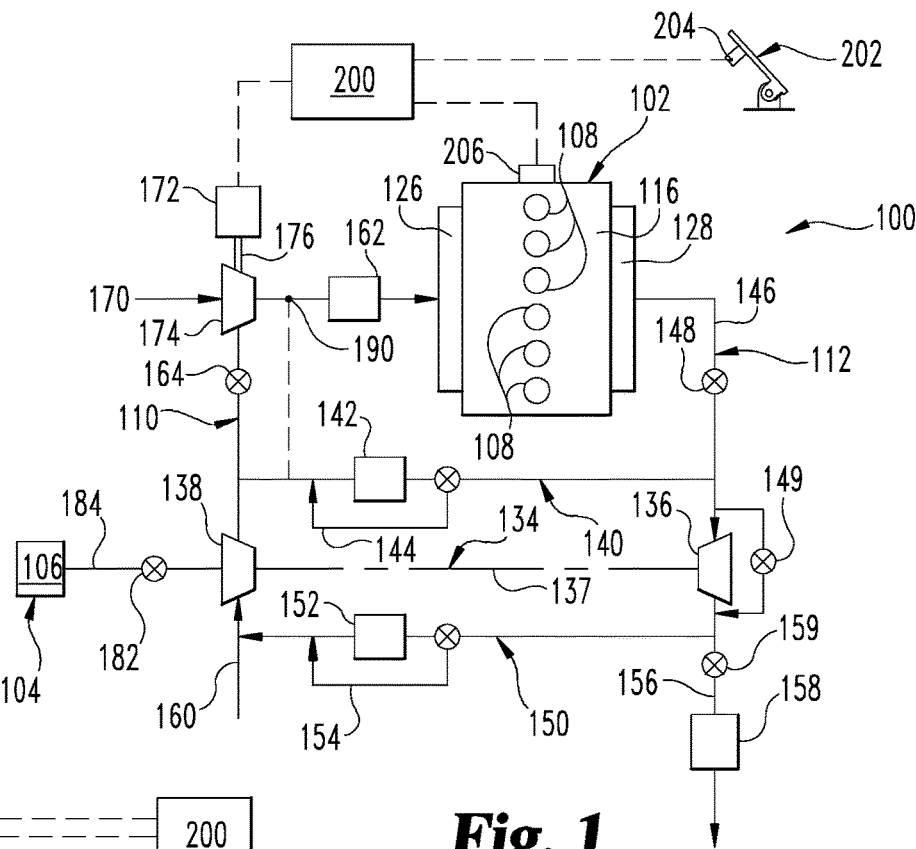
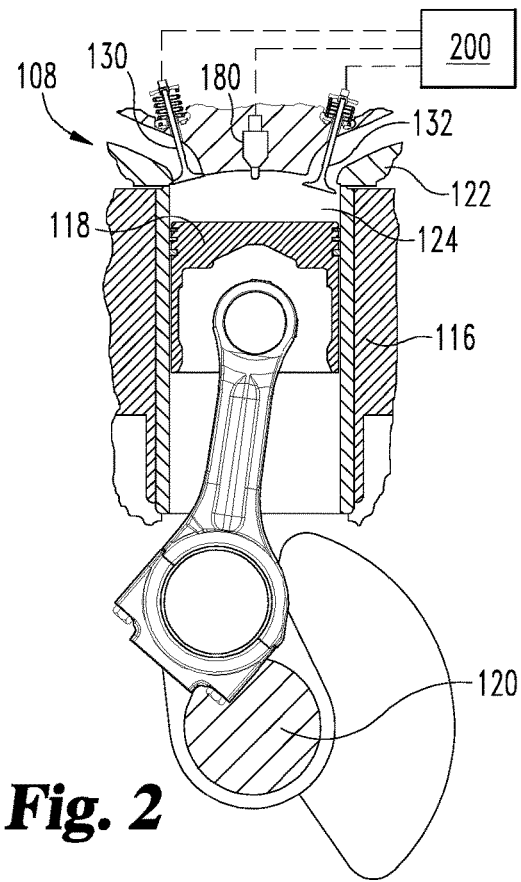
Fig. 1
Fig. 2

SUPERCHARGING FOR IMPROVED ENGINE BRAKING AND TRANSIENT PERFORMANCE

BACKGROUND

Developments in modern internal combustion engines are continually being driven toward improved fuel efficiency and emissions reduction. For example, diesel engines can be downsized and have their speed capability reduced to improve efficiency. Spark-ignited engines that employ gaseous fuel and hybrid power trains that employ electric motors in addition to an engine are further examples of such developments to improve efficiencies and emissions performance.

However, there are drawbacks to these developments. For example, the transient response capability and engine braking performance of these engines suffer due to downspeeding, downsizing, lower compression ratio and/or Miller cycling to improve efficiencies. Therefore, further improvements in this area are needed.

SUMMARY

Various aspects for improving engine braking and/or transient response of an internal combustion engine are disclosed. In one embodiment, the internal combustion engine is a spark-ignited engine that receives a pre-mixed fuel flow, and a supercharger device is employed so that, in response to engine braking events and transient events associated with the internal combustion engine, a compression boost of the intake flow is provided to boost engine braking power and torque response capabilities. The supercharger device can be, for example, a clutched supercharger that is selectively engaged to the engine or an electronically controlled compressor.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

BRIEF DESCRIPTION OF THE DRAWINGS

FIG. 1 is a schematic block diagram of an internal combustion engine system with a supercharger device.

FIG. 2 is a schematic diagram of an engine cylinder of the internal combustion engine of FIG. 1.

DESCRIPTION OF THE ILLUSTRATIVE EMBODIMENTS

Figure 3:
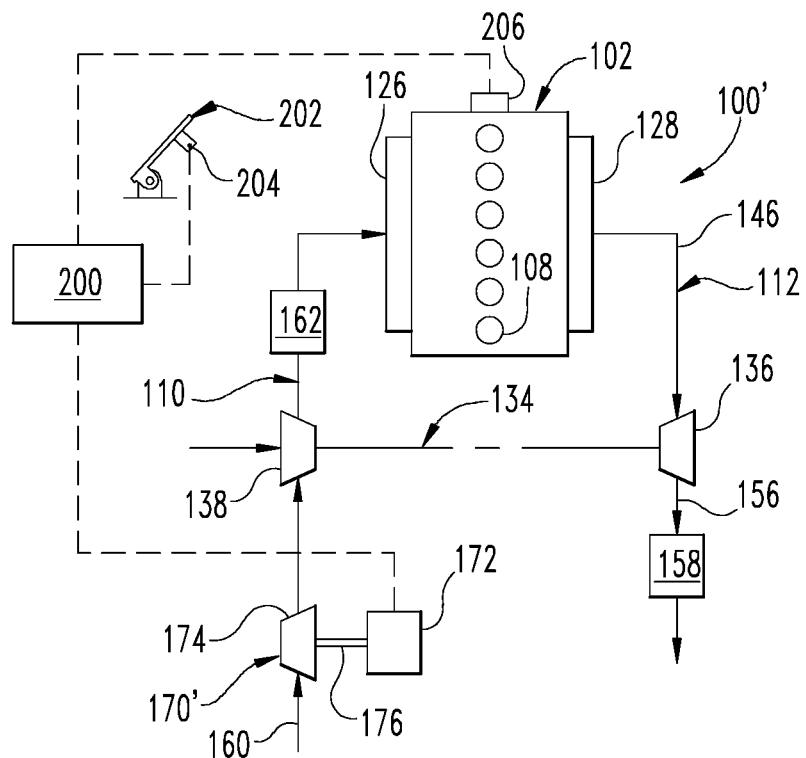
FIG. 3 is a schematic block diagram of another embodiment internal combustion engine system with a supercharger device.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

With reference to FIG. 1, an internal combustion engine system 100 is illustrated in schematic form. Internal combustion engine system 100 includes an internal combustion engine 102 and a fueling system 104 that is operable with internal combustion engine system 100 to provide fueling for engine 102 from a fuel source 106. In one embodiment, only one fuel source 106 is provided and is located so that the fuel is pre-mixed with the charge flow upstream of the combustion chambers of engine cylinders 108. In another embodiment, fueling system 104 includes an optional second fuel source (not shown) for providing fueling, and internal combustion engine system 100 is a dual fuel system.

Internal combustion engine system 100 includes engine 102 connected with an intake system 110 for providing an intake flow to engine 102 and an exhaust system 112 for output of exhaust gases in an exhaust flow. In certain embodiments, the engine 102 includes a pre-mix internal combustion engine in which a pre-mixed fuel flow is pre-mixed with the intake flow to provide a charge flow upstream of cylinders 108. The pre-mixed fuel can be a gaseous fuel such as, for example, natural gas, bio-gas, methane, propane, ethanol, producer gas, field gas, liquefied natural gas, compressed natural gas, or landfill gas. In other embodiments, the pre-mixed fuel can be gasoline that is port injected or direct injected.

In another embodiment, engine 102 includes a lean combustion engine such as a diesel cycle engine that uses a liquid fuel such as diesel fuel. However, other types of liquid and gaseous fuels are not precluded unless noted otherwise. In the illustrated embodiment, the engine 102 includes six cylinders 108 in an in-line arrangement. However, the number of cylinders (individually and collectively referred to as cylinders 108) may be any number, and the arrangement of cylinders 108, unless noted otherwise, may be any arrangement including the in-line arrangement as shown or a V-shaped arrangement, and is not limited to the number and arrangement shown in FIG. 1.

Referring to FIG. 1 and to FIG. 2, engine 102 includes an engine block 116 that at least partially defines the cylinders 108. A plurality of pistons, such as piston 118, may be slidably disposed within respective cylinders 108 to reciprocate between a top-dead-center position and a bottom-dead-center position while rotating a crank shaft 120. Each of the cylinders 108, its respective piston 118, and the cylinder head 122 form a combustion chamber 124. Each cylinder 108 includes one or more intake valves 130 and one or more exhaust valves 132 that are selectively opened and closed to control the entrance of the charge flow and exit of exhaust flow. Each cylinder 108 also includes a spark plug 180 for controlling the timing and initiation of the combustion process.

In one embodiment, engine 102 is a four stroke engine. That is, for each complete engine combustion cycle (i.e., for every two full crank shaft 120 rotations), each piston 118 of each cylinder 108 moves through an intake stroke, a compression stroke, a combustion or power stroke, and an exhaust stroke. Thus, during each complete combustion cycle for the depicted six cylinder engine, there are six strokes during which air is drawn into individual combustion chambers 124 from an intake manifold 126 and six strokes during which exhaust gas is supplied to an exhaust manifold 128.

The engine 102 includes cylinders 108 connected to the intake system 110 to receive the intake flow and the pre-mixed fuel. Cylinders 108 are connected to exhaust system 112 to release exhaust gases produced by combustion of the fuel(s) in combustion chambers 124. Exhaust system 112 provides exhaust flow to a turbocharger 134. In other embodiments, multiple turbochargers are included to provide high pressure and low pressure turbocharging stages that compress the intake flow.

Furthermore, exhaust system 112 can be connected to intake system 110 with one or both of a high pressure exhaust gas recirculation (EGR) system 140 and a low pressure EGR system 150. EGR systems 140, 150 may include a cooler 142, 152 and bypass 144, 154, respectively. In other embodiments, one or both of EGR systems 140, 150 are not provided. When provided, EGR system(s) 140, 150 provide exhaust gas recirculation to engine 102 in certain operating conditions. In any EGR arrangement during at least certain operating conditions, at least a portion the exhaust output of cylinder(s) 108 is recirculated to the engine intake system 110.

In the high pressure EGR system 140, the exhaust gas from the cylinder(s) 108 takes off from exhaust system 112 upstream of turbine 136 of turbocharger 134 and combines with intake flow at a position downstream of compressor 138 of turbocharger 134 and upstream of an intake manifold 126 of engine 102. In another embodiment high pressure EGR system, the exhaust gas from the cylinder(s) 108 takes off from exhaust system 112 upstream of turbine 136 of turbocharger 134 and combines with intake flow at a position downstream of compressor 138 of turbocharger 134 and downstream of a supercharger device 170, as indicated at connection 190. In the low pressure EGR system 150, the exhaust gas from the cylinder(s) 108 takes off from exhaust system 112 downstream of turbine 136 of turbocharger 134 and combines with intake flow at a position upstream of compressor 138 of turbocharger 134. The recirculated exhaust gas may combine with the intake gases in a mixer (not shown) of intake system 110 or by any other arrangement. In certain embodiments, the recirculated exhaust gas returns to the intake manifold 126 directly.

Intake system 110 includes one or more inlet supply conduits connected to an engine intake manifold 126, which distributes the charge flow to cylinders 108 of engine 102. Exhaust system 112 is also coupled to engine 102 with engine exhaust manifold 128. Exhaust system 112 includes an exhaust conduit 146 extending from exhaust manifold 128 to an exhaust valve 148. In the illustrated embodiment, exhaust conduit 146 further extends to turbine 136 of turbocharger 134. Turbine 136 includes a valve such as controllable waste gate 149 or other suitable bypass that is operable to selectively bypass at least a portion of the exhaust flow from turbine 136 to reduce boost pressure and engine torque under certain operating conditions. In another embodiment, turbine 136 is a variable geometry turbine with a size-controllable inlet opening. In another embodiment, the exhaust valve 148 is an exhaust throttle that can be closed or opened.

An aftertreatment system 158 can be connected with an outlet conduit 156. The aftertreatment system 158 may include, for example, three way catalysts (TWC), oxidation devices (DOC), particulate removing devices (DPF, CDPF), constituent absorbers or reducers (SCR, AMOX, LNT), reductant systems, and other components if desired. In one embodiment, an exhaust throttle 159 is provided downstream of turbine 136.

In one embodiment, exhaust conduit 146 is flow coupled to exhaust manifold 128, and may also include one or more intermediate flow passages, conduits or other structures. Exhaust conduit 146 extends to turbine 136 of turbocharger 134. Turbocharger 134 may be any suitable turbocharger known in the art, including variable-geometry turbine turbochargers and waste-gated turbochargers. Turbocharger 134 may also include multiple turbochargers. Turbine 136 is connected via a shaft 137 to compressor 138 that is flow coupled to inlet supply conduit 160.

Compressor 138 receives an intake flow from intake air supply conduit 160. Fuel source 106 may also be flow coupled at or upstream of the inlet to compressor 138 which provides a pre-mixed charge flow including the intake flow and fuel flow to cylinders 108. Intake system 110 may further include a compressor bypass (not shown) that connects a downstream or outlet side of compressor 138 to an upstream or inlet side of compressor 138. Inlet supply conduit 160 may include a charge air cooler 162 downstream from compressor 138 and intake throttle 164. In another embodiment, a charge air cooler is located in the intake system 110 upstream of intake throttle 164. Charge air cooler 162 may be disposed within inlet air supply conduit 160 between engine 102 and compressor 138, and embody, for example, an air-to-air heat exchanger, an air-to-liquid heat exchanger, or a combination of both to facilitate the transfer of thermal energy to or from the flow directed to engine 102.

In operation of internal combustion engine system 100, fresh air is supplied through inlet air supply conduit 160. The fresh air flow or combined flows can be filtered, unfiltered, and/or conditioned in any known manner, either before or after mixing with the EGR flow from EGR systems 140, 150 when provided. The intake system 110 may include components configured to facilitate or control introduction of the charge flow to engine 102, and may include intake throttle 164, one or more compressors 138, and charge air cooler 162. The intake throttle 164 may be connected upstream or downstream of compressor 138 via a fluid passage and configured to regulate a flow of atmospheric air and/or combined air/EGR flow to engine 102. Compressor 138 may be a fixed or variable geometry compressor configured to receive air or air and fuel mixture from fuel source 106 and compress the air or combined flow to a predetermined pressure level before engine 102. The charge flow is pressurized with compressor 138 and sent through charge air cooler 162 and supplied to engine 102 through intake supply conduit 160 to engine intake manifold 126.

In the illustrated embodiment, at least one of a port injector at each cylinder 108 or a mixer at an inlet of compressor 138 can be provided for delivery or induction of fuel from the fuel source 106 with the charge flow delivered to cylinders 108. In another embodiment, a mixer at an inlet of high pressure EGR flow downstream of compressor 138 can be provided for delivery or induction of fuel from the fuel source 106 with the charge flow delivered to cylinders 108. In certain embodiments, the cylinders 108 may alternatively or additionally include at least one direct injector for delivering fuel to the combustion chamber 124 thereof from a liquid fuel source.

A direct injector, as utilized herein, includes any fuel injection device that injects fuel directly into the cylinder volume (combustion chamber), and is capable of delivering fuel into the cylinder volume when the intake valve(s) and exhaust valve(s) are closed. The direct injector may be structured to inject fuel at the top of the cylinder or laterally of the cylinder. In certain embodiments, the direct injector may be structured to inject fuel into a combustion pre-chamber. Each cylinder 108 may include one or more direct injectors.

A port injector, as utilized herein, includes any fuel injection device that injects fuel outside the engine cylinder in the intake manifold to form the air-fuel mixture. The port injector injects the fuel towards the intake valve. During the intake stroke, the downwards moving piston draws in the air/fuel mixture past the open intake valve and into the combustion chamber. Each cylinder 108 may be associated with at least one port injector.

In certain dual fuel embodiments, each cylinder 108 includes at least one direct injector that is capable of providing all of the designed primary fueling amount from a fuel source to the cylinders 108 at any operating condition. Fuel source 106 provides a flow of a pre-mixed fuel to each cylinder 108 through a port injector or a natural gas connection upstream of intake manifold 126 to provide a second fuel flow (in the dual fuel embodiment) or the sole fuel flow (in single fuel source embodiments) to the cylinders 108 to achieve desired operational outcomes, such as improved efficiency, improved fuel economy, improved high load operation, and other outcomes.

In any embodiment, the fuelling provided to cylinders 108 from the fuel source, such as fuel source 106, is controlled by controller 200 to control the flow of fuel in accordance with engine speed, engine loads, intake manifold pressure and temperature, and fuel pressures, for example. Engine 102 includes one or more engine sensors 206 operably connected to controller 200 to provide signals indicative of one or more of the engine speed, load, intake manifold pressure and temperature, and fuel pressures, for example. In one embodiment, an input device 202 is provided that includes a sensor 204 operable to provide a signal to controller 200 indicative of a torque request to engine 102. In one embodiment, input device 202 is an accelerator pedal. In another embodiment, input device 202 is a brake pedal. Embodiments including both accelerator and brake pedals are also contemplated.

One embodiment of system 100 shown in FIG. 2 includes each of the cylinders 108 with spark plug 180. Spark plugs 180 are electrically connected with controller 200 to receive spark or firing commands that provide a spark in the respective cylinder 108 in accordance with a spark timing command determined according to engine operating conditions and operator demand by reference to fueling maps, control algorithms, or other fueling rate/amount determination source stored in controller 200. The fuel is also controlled by controller 200 provide a flow of fuel from fuel source 106 to each of the cylinders 108 in a rate, amount and timing determined by controller 200 that achieves a desired torque and exhaust output from cylinders 108. In one embodiment, a shutoff valve 182 can be provided in fuel line 184 and/or at one or more other locations in fuel system 104 that is connected to controller 200 to control the fuel flow.

Controller 200 can be connected to actuators, switches, or other devices associated with fuel pump(s), shutoff valve 182, fuel injectors, intake throttle 164, waste gate 149 or an inlet to a VGT or an exhaust throttle 148 or exhaust throttle 159, and/or spark plugs 180, and configured to provide control commands thereto that regulate the amount, timing and duration of the flows of the gaseous and/or liquid fuels to cylinders 108, the charge flow, the EGR flow, and the exhaust flow to provide the desired torque and exhaust output. In addition, controller 200 can be connected to one or more sensors 206 (physical and/or virtual) associated with engine 102 and configured to detect a compression braking event and/or a transient event associated with engine 102 during operation of engine 102. Controller 200 can also be connected to a user switch in the vehicle that allows for operator selection of the braking level.

Internal combustion engine system 100 further includes a supercharger device 170 connected to intake system 110. In the FIG. 1 embodiment, supercharger device 170 includes an electric motor 172 that is connected to a compressor 174 with a shaft 176 and also connected electrically to controller 200. Electric motor 172 responds to control commands from controller 200 to selectively start and stop motor 172 to drive compressor 174 via shaft 176 and to provide a compression boost to the intake flow and/or charge flow to engine 102.

In one embodiment, controller 200 is configured to determine or detect a compression braking event for engine 102 and to initiate operation of supercharger device 170 in response to the compression braking event by providing a signal to motor 172 to start and operate compressor 174 to compress the intake/charge flow during all or a part of the compression braking event. In one embodiment, controller 200 is configured to determine or detect a transient event for engine 102 and to initiate operation of supercharger device 170 in response to the transient event by providing a signal to motor 172 to start and operate compressor 174 to compress the intake/charge flow during all or a part of the transient event.

In the FIG. 1 embodiment, supercharger device 170 is located along intake conduit 160 downstream of compressor 138 and intake throttle 164. Thus, the supercharger device 170 in FIG. 1 further compresses compressed charge flow, which includes the intake flow and fuel from fuel source 102. In another embodiment, such as shown in FIG. 3, internal combustion engine system 100' includes supercharger device 170' that is located along intake conduit 160 upstream of compressor 138. Therefore, when operation of supercharger device 170' is initiated, compressed intake flow is provided to compressor 138 before fuel is provided to the intake flow. Elements of system 100' that are similar to system 100 are designated with like reference numerals and not re-described for sake of brevity.

Figure 4:
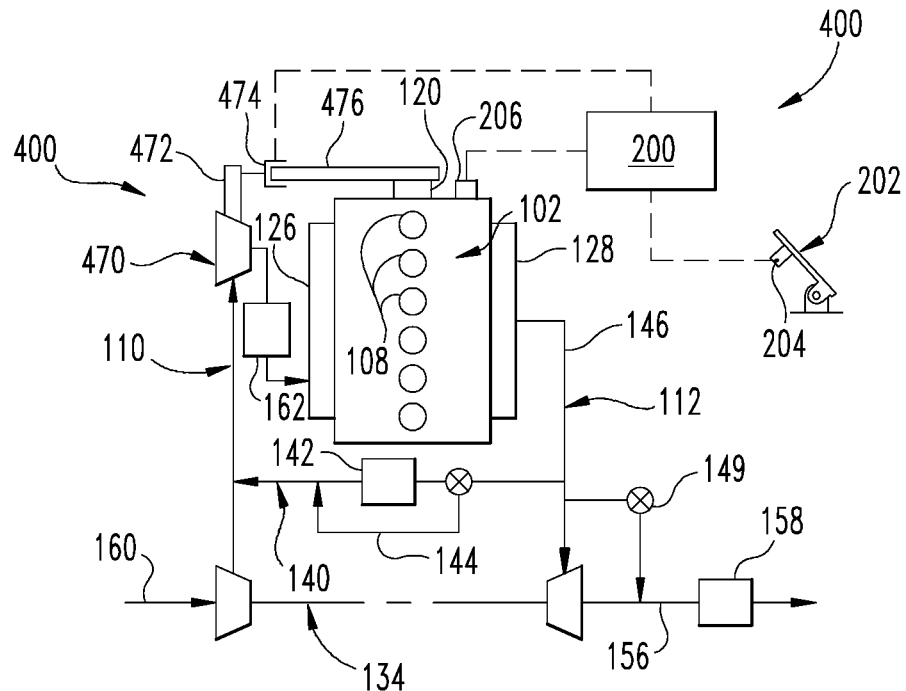
FIG. 4 is a schematic block diagram of another embodiment internal combustion engine system with a supercharger device.

In still another embodiment internal combustion engine system 400 shown in FIG. 4, there is a supercharger device 470 in the intake system 110. Elements of system 400 that are similar to system 100 are designated with like reference numerals and not re-described for sake of brevity. Supercharger device 470 includes a supercharger with a shaft 472 that is connected to crank shaft 120 of engine 102 with a clutch 474 and pulley 476. Clutch 474 is operably connected to controller 200 which provides signals for selectively engaging and disengaging clutch 474 to selectively connect and disconnect shaft 472 to crank shaft 120 so that crank shaft 120 drives supercharger device 470. As discussed above with respect to supercharger device 170, supercharger device 470 is selectively controlled to operate in response to one or both of an engine compression braking event and a transient event associated with engine 102 to compress the intake flow.

Figure 5:
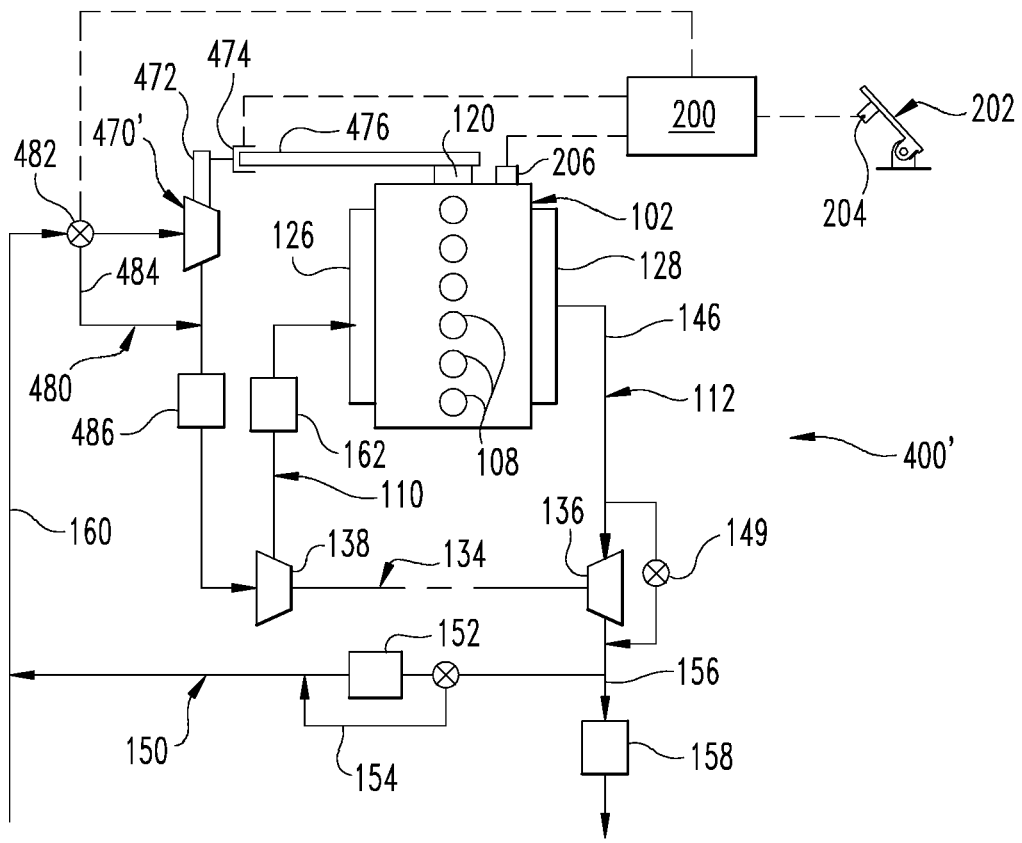
FIG. 5 is a schematic block diagram of another embodiment internal combustion engine system with a supercharger device.

In the FIG. 4 embodiment, supercharger device 470 is located downstream of compressor 138 and upstream of intake manifold 126. In this embodiment, supercharger device 470 receives a compressed intake/charge flow from compressor 138. In another embodiment internal combustion engine system 400' shown in FIG. 5, supercharger device 470' is located upstream of compressor 138 of turbocharger 134. In this embodiment, supercharger device 470' provides a compressed intake flow to compressor 138. Elements of system 400' that are similar to system 100 are designated with like reference numerals and not re-described for sake of brevity.

Internal combustion engine system 400' also includes a supercharger device bypass 480 that includes a controllable bypass valve 482 that is operable to direct the intake flow to supercharger device 470', or to bypass supercharger device 470' through bypass conduit 484 when additional compression of the intake flow is not desired, such as during steady state operations. Internal combustion engine system 400' may further include an intercooler 486 between supercharger device 470' and compressor 138.

While various embodiments and arrangements of an internal combustion engine system in FIGS. 1-5 have been shown, it should be understood that additional components associated with internal combustion engine systems may be provided and are not precluded, and that features from each of these embodiments may be incorporated in, combined with, or omitted from one or more of the other embodiments.

Figure 6:
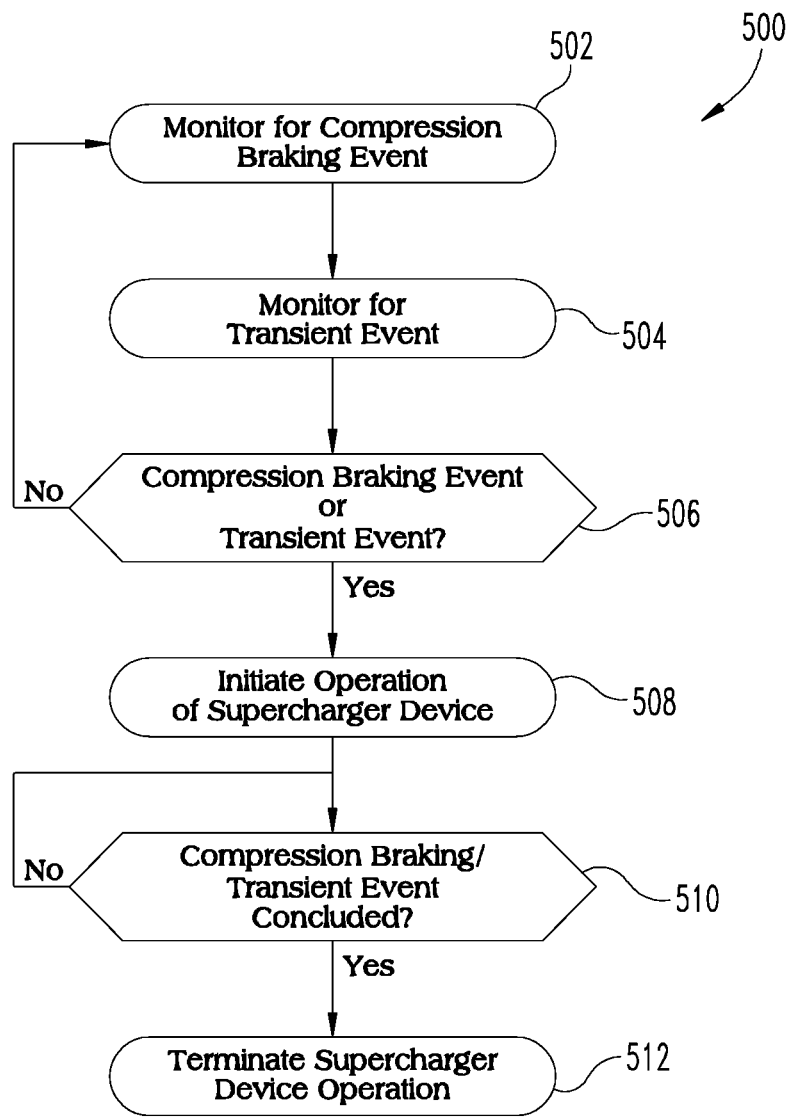
FIG. 6 is a schematic flow diagram of a procedure for managing operation of the supercharger device.

Referring now to FIG. 6, there is shown a procedure 500 for operating the internal combustion engine system embodiments described herein. Procedure 500 starts at operation 502 to monitor for operating conditions of engine 102 that are indicative of a compression braking event. Example operating conditions indicative of a compression braking event include, for example, receiving an output from operator input device 202, such as release of an accelerator pedal or depression of a brake pedal, load shedding, a threshold reduction in load applied to engine 102, a threshold reduction in power demanded from engine 102, a threshold reduction in torque in an output shaft connected to engine 102, a threshold or sudden increase in engine speed or the engine speed, and/or a route grade. Accordingly, one or more sensors 204, 206 connected to controller 200 are operable to provide operating signals indicating one or more operating parameters or conditions of engine 102 that indicate a compression braking event.

From operation 502, procedure 500 continues at operation 504 to monitor for operating conditions indicative of a transient event for engine 102. Operating conditions indicative a transient event can include, for example, depression of input device 202 corresponding to an accelerator tip-in event, a threshold increase in load applied to engine 102, a threshold increase in power demanded from engine 102, and/or a threshold increase in torque in an output shaft connected to engine 102. Accordingly, one or more sensors 204, 206 connected to controller 200 are operable to provide operating signals indicating one or more operating parameters or conditions of engine 102 that indicate a transient event.

Procedure 500 continues from operation 504 at conditional 506 to determine whether there is a compression braking event or a transient event present. If conditional 506 is negative, procedure 500 returns to continue the monitoring operations 502, 504. If conditional 506 is positive, procedure 500 continues at operation 508 to initiate operation of a supercharger device, such as supercharger device 170, 170', 470, or 470'.

Procedure 500 continues from operation 508 to conditional 510 to determine if the compression braking or transient event is concluded. If conditional 510 is negative, procedure 500 returns to operation 508. If conditional 510 is positive, procedure continues at operation 512 to terminate operation of the supercharger device.

With the systems and methods such as those shown in FIGS. 1-6, control strategies may be implemented to provide engine compression braking for a spark-ignited engine that can approach engine braking performance available from effective conventional engine compression brake systems employed with compression ignition engines. In addition, control strategies can be provided to improve engine response and performance during transient events.

Engine braking provides energy absorption to, for example, slow the acceleration of a vehicle on downward route grades. During engine braking, in addition to operating the supercharger device 170, 170', 470, 470', the engine 102 is motored via the powertrain from the motion of the vehicle and fuel is cut so the engine 102 absorbs power by overcoming internal friction, driving accessories, and pumping air through the cylinders 108. Some engines also include compression release brakes that operate by modifying the exhaust valve actuation so that the engine does more work to pump air through the cylinders 108.

The supercharger devices 170, 170', 470, 470' increase air charge density in the charge flow provided to cylinders 108, which increases the amount of trapped air with each intake stroke and cause additional work for each compression event. This in effect increases the compression ratio of each cylinder and the power absorption through the crank shaft 120 to enhance engine compression braking.

The supercharger devices can also be employed in response to transient events to provide boosted air to the cylinders 108 for combustion and increased power. Since supercharger 470, 470' consumes power from crank shaft 120 during transient conditions, in certain embodiments supercharger device 170, 170' is preferred since they do not impose a load on the crank shaft 120 during the transient response.

Various aspects of the present disclosure are contemplated. According to one aspect, a system includes an internal combustion engine with an intake system and an exhaust system. The internal combustion engine also includes a plurality of cylinders for receiving a pre-mixed fuel flow for spark ignition by the internal combustion engine. The system also includes a turbocharger including a turbine connected to receive exhaust flow from the exhaust system and a compressor connected to receive an intake flow from the intake system. The exhaust flow drives the turbine to drive the compressor to compress the intake flow. The system further includes a supercharger device connected to the intake system that is operable to compress the intake flow and a controller configured to detect a compression braking event for the internal combustion engine and operate the supercharger device. The supercharger device operation is initiated by the controller in response to the compression braking event to provide a compression boost of the intake flow to the internal combustion engine.

In one embodiment, the controller is configured to operate the supercharger device in response to a transient event by the internal combustion engine, and the supercharger device operation is initiated by the controller in response to the transient event. In another embodiment, the internal combustion engine includes a crank shaft that is connected to the supercharger device with a clutch to selectively engage the supercharger device with the crank shaft to initiate supercharger device operation and to disengage the supercharger device from the crank shaft to terminate supercharger device operation.

In one embodiment, the supercharger device and the compressor each compress the intake flow when the supercharger device is operating. In a refinement of this embodiment, the supercharger device is upstream of the compressor. In another refinement of this embodiment, the supercharger device is downstream of the compressor and the intake flow to the supercharger device includes fuel.

In another embodiment, the supercharger device includes a motor operably connected to the controller and a shaft connecting the motor to a compressor. In another embodiment, a bypass is provided that is configured to selectively route the intake flow around the supercharger device.

In yet another embodiment, an exhaust gas recirculation loop is provided to direct at least part of the exhaust flow to a location between the compressor and the supercharger device. In still another embodiment, an exhaust gas recirculation loop is provided for directing at least part of the exhaust flow to a location upstream of the supercharger device and upstream of the compressor.

In another aspect, an apparatus includes a controller operably connected to an internal combustion engine that includes an intake system and an exhaust system. The internal combustion engine includes a plurality of cylinders for receiving a pre-mixed fuel flow for spark ignition by the internal combustion engine and a turbocharger with a turbine to receive exhaust flow from the exhaust system and a compressor connected to the turbine to receive an intake flow from the intake system. The internal combustion further includes a supercharger device connected to the intake system that is operable to compress the intake flow. The controller is configured to detect a compression braking event associated with the internal combustion engine and initiate operation of the supercharger device in response to the compression braking event to provide a compression boost of the intake flow.

In one embodiment, the controller is configured to initiate operation of the supercharger device in response to a transient event of the internal combustion engine to provide a compression boost of the intake flow. In another embodiment, the controller is configured to initiate operation of the supercharger device by engaging a clutch that selectively connects the supercharger device to a crank shaft of the internal combustion engine. In yet another embodiment, the controller is configured to initiate operation of the supercharger device by providing a signal to an electric motor that operates a compressor of the supercharger device.

According to another aspect, a method includes operating an internal combustion engine including a plurality of cylinders for receiving an intake flow and producing an exhaust flow by spark ignition of a pre-mixed fuel in the intake flow, the internal combustion engine further including a turbocharger and a supercharger device; detecting an engine compression braking event during operation of the internal combustion engine and the turbocharger; and initiating operation of the supercharger device to compress the intake flow to the plurality of cylinders and increase a compression ratio of the plurality of cylinders in response to the engine compression braking event.

In one embodiment, the method includes detecting a transient event during operation of the internal combustion engine and initiating operation of the supercharger device to compress the intake flow to the plurality of cylinders in response to the transient event. In another embodiment, the method includes initiating operation of the supercharger device by coupling the supercharger device to a crank shaft of the internal combustion engine with a clutch. In another embodiment, initiating operation of the supercharger device includes providing an electronic signal to a motor that drives a compressor of the supercharger device.

In a further embodiment, the supercharger device receives compressed intake flow and the pre-mixed fuel from the turbocharger and boosts compression of the compressed intake flow and pre-mixed fuel. In another embodiment, the supercharger device provides compressed intake flow to the turbocharger for further compression.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system, comprising:
   an internal combustion engine including an intake system and an exhaust system, the internal combustion engine including a plurality of cylinders for receiving a pre-mixed fuel flow for spark ignition by the internal combustion engine;
   a turbocharger including a turbine connected to receive exhaust flow from the exhaust system and a compressor connected to receive an intake flow from the intake system, wherein the exhaust flow drives the turbine to drive the compressor to compress the intake flow;
   a supercharger device connected to the intake system that is operable to compress the intake flow; and
   a controller configured to detect a compression braking event for the internal combustion engine and to start and operate the supercharger device, wherein the supercharger device operation is initiated by the controller by starting the supercharger device in response to the detection of the compression braking event to provide a compression boost of the intake flow to the internal combustion engine.

2. The system according to claim 1, wherein the controller is configured to start and operate the supercharger device in response to a transient event by the internal combustion engine, wherein the supercharger device operation is initiated by the controller by starting the supercharger device in response to the transient event.

3. The system according to claim 1, wherein the internal combustion engine includes a crank shaft that is connected to the supercharger device with a clutch to selectively engage the supercharger device with the crank shaft to start the supercharger device and initiate supercharger device operation and to disengage the supercharger device from the crank shaft to terminate supercharger device operation.

4. The system according to claim 1, wherein the supercharger device and the compressor each compress the intake flow when the supercharger device is operating.

5. The system according to claim 4, wherein the supercharger device is upstream of the compressor.

6. The system according to claim 4, wherein the supercharger device is downstream of the compressor and the intake flow to the supercharger device includes fuel.

7. The system according to claim 1, wherein the supercharger device includes a motor operably connected to the controller and a shaft connecting the motor to a compressor.

8. The system according to claim 1, further comprising a bypass configured to selectively route the intake flow around the supercharger device.

9. The system according to claim 1, further comprising an exhaust gas recirculation loop for directing at least part of the exhaust flow to a location between the compressor and the supercharger device.

10. The system according to claim 1, further comprising an exhaust gas recirculation loop for directing at least part of the exhaust flow to a location upstream of the supercharger device and upstream of the compressor.

11. The system according to claim 1, further comprising an exhaust gas recirculation loop for directing at least part of the exhaust flow to a location downstream of the supercharger device and downstream of the compressor.

12. An apparatus, comprising:
a controller operably connected to an internal combustion engine including an intake system and an exhaust system, the internal combustion engine including a plurality of cylinders for receiving a pre-mixed fuel flow for spark ignition by the internal combustion engine, the internal combustion engine including a turbocharger with a turbine to receive exhaust flow from the exhaust system and a compressor connected to the turbine to receive an intake flow from the intake system, the internal combustion engine further including a supercharger device connected to the intake system that is operable to compress the intake flow, wherein the controller is configured to:
detect a compression braking event associated with the internal combustion engine; and
initiate operation of the supercharger device by starting the supercharger device in response to the detection of the compression braking event to provide a compression boost of the intake flow.

13. The apparatus according to claim 12, wherein the controller is configured to initiate operation of the supercharger device by starting the supercharger device in response to a transient event of the internal combustion engine to provide a compression boost of the intake flow.

14. The apparatus of claim 12, wherein the controller is configured to initiate operation of the supercharger device by engaging a clutch that selectively connects the supercharger device to a crank shaft of the internal combustion engine to start and operate the supercharger device.

15. The apparatus of claim 12, wherein the controller is configured to initiate operation of the supercharger device by providing a signal to an electric motor that starts and operates a compressor of the supercharger device.

16. A method, comprising:
operating an internal combustion engine including a plurality of cylinders for receiving an intake flow and producing an exhaust flow by spark ignition of a pre-mixed fuel in the intake flow, the internal combustion engine further including a turbocharger and a supercharger device;
detecting an engine compression braking event during operation of the internal combustion engine and the turbocharger; and
initiating operation of the supercharger device by starting a compressor of the supercharger device to compress the intake flow to the plurality of cylinders and increase compression work of the plurality of cylinders in response to the detection of the engine compression braking event.

17. The method according to claim 16, further comprising:
detecting a transient event during operation of the internal combustion engine; and
initiating operation of the supercharger device to compress the intake flow to the plurality of cylinders by starting the compressor in response to the transient event.

18. The method according to claim 16, wherein initiating operation of the supercharger device includes coupling the supercharger device to a crank shaft of the internal combustion engine with a clutch to start the compressor.

19. The method according to claim 16, wherein initiating operation of the supercharger device includes providing an electronic signal to a motor that starts and drives a compressor of the supercharger device.

20. The method according to claim 16, wherein the supercharger device receives compressed intake flow and the pre-mixed fuel from the turbocharger and boosts compression of the compressed intake flow and pre-mixed fuel.

21. The method according to claim 16, wherein the supercharger device provides compressed intake flow to the turbocharger for further compression.

* * * * *